(12) United States Patent
Ho

(10) Patent No.: US 12,457,949 B2
(45) Date of Patent: Nov. 4, 2025

(54) PLANTING MACHINE

(71) Applicant: Grace Yan Yu Ho, N.T. (HK)

(72) Inventor: Grace Yan Yu Ho, N.T. (HK)

(*) Notice: Subject to any disclaimer, the term of this patent is extended or adjusted under 35 U.S.C. 154(b) by 0 days.

(21) Appl. No.: 18/235,527

(22) Filed: Aug. 18, 2023

(65) Prior Publication Data

US 2024/0260522 A1 Aug. 8, 2024

(30) Foreign Application Priority Data

Feb. 2, 2023 (CN) .......................... 202320101625.1

(51) Int. Cl.
*A01G 27/00* (2006.01)
*A01G 7/04* (2006.01)
*A01G 31/02* (2006.01)
*A01G 31/06* (2006.01)

(52) U.S. Cl.
CPC ............. *A01G 31/02* (2013.01); *A01G 7/045* (2013.01)

(58) Field of Classification Search
CPC ...... A01G 31/02; A01G 31/06; A01G 27/006; A01G 27/00
See application file for complete search history.

(56) References Cited

U.S. PATENT DOCUMENTS

| | | | | |
|---|---|---|---|---|
| 10,440,900 B1* | 10/2019 | Higgins | ............... | H05B 47/19 |
| 10,973,186 B2* | 4/2021 | Blackburn | ............ | A01G 9/029 |
| 11,457,577 B1* | 10/2022 | Gao | ...................... | A01G 31/02 |
| 12,096,727 B2* | 9/2024 | Pape | ........................ | A01G 2/10 |
| 2006/0218860 A1* | 10/2006 | DeFrancesco | ......... | A01G 31/02 47/62 R |
| 2009/0126269 A1* | 5/2009 | Wilson | ................ | A01K 63/003 47/62 R |
| 2012/0085026 A1* | 4/2012 | Morris | ................... | A01G 31/06 47/62 A |
| 2016/0128289 A1* | 5/2016 | Wong | .................. | G05B 19/041 47/62 A |
| 2016/0242372 A1* | 8/2016 | Wong | ..................... | A01G 9/249 |
| 2019/0246584 A1* | 8/2019 | Hsueh | .................... | A01G 9/023 |
| 2019/0335691 A1* | 11/2019 | Krakover | .............. | A01G 31/06 |

* cited by examiner

*Primary Examiner* — Kristen C Hayes
(74) *Attorney, Agent, or Firm* — WPAT, PC

(57) ABSTRACT

A planting machine, comprising a planting water tank which is opened at the upper surface and covered with a movable cover, and planting cups for planting plants are arranged on the movable cover; a flow hold which is provided on at least one side of the planting water tank, and a lid which is set to close the flow hole; a light group, which is suspended or fixed above the planting water tank; a controller which provides an output port, the light group connect to the output port. Multiple planting water tanks can be spliced through the flow holes to form a complete indoor planting system, which can facilitate users to flexibly arrange and design the connection of the planting water tanks according to the home or furniture settings to achieve adaptation, thereby improving the existing indoor planting system. The design of hydroponic planting, the planting water tank and the light group uses a modular design, which is convenient for free matching and installation according to the needs of the planting space, which is more beautiful and convenient.

9 Claims, 12 Drawing Sheets

PLANTING MACHINE

FIELD OF THE INVENTION

The invention involves the field of hydroponics planting technology, in particular the planting machine.

BACKGROUND OF THE INVENTION

With the continuous improvement of people's living standards, people's pursuit of living materials is also changing. More people choose to plant flowers and plants or some crops at home. Flowers and plants can beautify the home environment, while crops can be eaten. However, people living in cities do not have an area that can be used for farming, so household planters have become the choice of people.

During the process of implementing the embodiments of the present application, the inventors found that: when plants are grown at home, more light needs to be added to the plants, and sufficient water sources should be provided. At present, in the process of using a planter, users often need to combine many planters, but these planters are only arranged neatly, and it is complicated to connect, so it is not easy to use.

SUMMARY OF THE INVENTION

The present invention provides a planting machine to solve the following problems: users often need to combine many planters, but these planters are only arranged neatly, and it is complicated to connect, so it is not easy to allow people to grow food inside the furniture, e.g. on shelves or grow more food in limited space.

The invention provides the following solutions:

A planting machine comprising:
- a planting water tank which is opened at the upper surface and covered with a movable cover, and planting cups for planting plants are arranged on the movable cover;
- a flow hold which is provided on at least one side of the planting water tank, and a lid which is set to close the flow hole;
- a light group, which is suspended or fixed above the planting water tank;
- a controller which provides an output port, the light group connect to the output port.

Further, a fastening groove is arranged at the flow hole of the planting water tank, and the cover is inserted into the fastening groove to seal the flow hole.

Further, a plurality of planting water tanks are spliced with each other and communicated through the flow holes; connecting pipe is used to communicate with the two flow holes are respectively inserted in the fastening grooves of the planting water tanks, and the connecting pipe is provided with pipe for connecting adjacent planting water tanks; the outer wall of the pipe matches the inner wall of the flow hole and are sealed together.

Further, a plurality of planting water tanks are spliced to form a planting group, and each planting group is connected to a water supply pipeline and the return water pipeline; and comprises a water storage device, which is connected to the water supply pipeline through a water pump, and the return water pipeline of the planting group is connected to the water storage device to form a planting system.

Further, the planting group and the return water pipeline are connected to the planting water tank through the flow hole, and a valve is arranged on the lid; the valve is fixed on the lid which is set at the flow hole through the fastening groove.

Further, a liquid level indicator is set at one side of the planting water tank for observing the liquid level of the water tank; the liquid level indicator is a light-transmitting window set on one side of the planting water tank.

Further, the movable cover plate is composed of two sets of cover plates which are connected by hinges, and the cover plate is provided with a handhold portion.

Further, the light group is composed of a mounting plate and a luminous plate; the mounting plate and the luminous plate are detachable; the mounting plate is provided with a hanging hook, and the luminous plate is hoisted under the mounting plate through the hanging hook.

Further, a magnet is embedded in the mounting plate to attract to an installation surface; and another magnet is set in the luminous plate to attract to the mounting plate.

Further, the machine comprises spray pipes which are arranged in the planting water tank, and the spray pipes are connected to a water pump, and the nozzle of the spray pipe extends to the root of the plant and sprays water to the root.

Further, the planting machine includes a first installation platform, a second installation platform, a conductive assembly, a controller and pillars. The first installation platform is provided with a through hole. The pillar has a first end and a second end arranged along the first direction, and the first end of the pillar is plugged and fixed with the first installation platform at the through hole. The second installation platform is provided with a second, a third and a fourth clamping part. The second clamping part is arranged opposite to the first end along the first direction, and the third clamping part is disposed opposite to the fourth clamping part along the second direction. The second end is plugged into the second installation platform. The conductive assembly includes a plurality of first conductive parts and second conductive parts, one of the first conductive parts is installed on the first installation platform, and the other first conductive part is installed on the second installation platform. One of the second conductive parts is disposed of on the same side as the third clamping part, and the other second conducting part is disposed of on the same side as the fourth clamping part. The controller is electrically connected to the first conductive parts and the second conductive parts, and the first conductive part and/or the second conductive part electrically connects the external power supply to the controller. Two planting machines may be connected along a first direction or a second direction, the first direction is perpendicular to the second direction. When the two planting machines are connected along the first direction, the first end of one planting machine engages with the second clamping part of the other planting machine, and the first conductive parts of the two planting machines are electrically connected. When the two planting machines are connected along the second direction, the third clamping part of one planting machine is engaged with the fourth clamping part of the other planting machine, and the second conductive parts of the two planters are electrically connected.

Further, the first end protrudes from the through hole along the first direction to form a clamping post. The second clamping part includes a clamping hole recessed inward along the first direction relative to the second installation platform. When the two planting machines are connected along the first direction, the clamping column of one planting machine extends into the clamping hole of the other planting machine.

Further, the third clamping part includes a clamping groove, and the clamping groove is recessed relative to the second installation platform along the second direction. The fourth clamping part includes a hook, and the hook protrudes relative to the second installation platform along the second direction. When the two planting machines are connected along the second direction, the hook of one planting machine extends into the clamping groove of the other planting machine.

Further, the second installation platform is provided with a planting water tank, one end of the planting water tank communicates with the external environment through the third clamping part, and the other end of the planting water tank communicates with the external environment through the fourth clamping part. When the two planting machines are connected along the second direction, the planting water tank of one planting machine communicates with the planting water tank of the other planting machine to form a liquid flow channel, and the liquid flow channel is used for liquid circulation.

Further, the planting machine also includes planting cups, the second installation platform is provided with a plurality of openings on the side close to the first installation platform, and the openings communicate with the planting water tank, and the planting cups are detachably installed in the opening, the planting cups are used for planting plants.

Further, the planting machine also includes an air pump installed in the planting water tank, the air pump is electrically connected to the controller, and the air pump is used to drive the liquid in the planting water tank to flow.

Further, the planting machine also includes: two movable covers, the movable covers are provided with handhold parts, one of the movable covers is detachably installed on the side of the planting water tank close to the third clamping part, and the other of the movable covers is detachably mounted on a side of the planting water tank close to the fourth clamping part, and the handhold parts are used for detaching the movable covers.

Further, the planter also includes pillars, one end of the pillar is connected to the first installation platform, the other end of the pillar is installed on the second installation platform, and the pillars are provided with a length scale.

Further, the planting machine also includes a light group, the light group is installed on a side of the first installation platform close to the second installation platform, the light group is electrically connected to the controller, and the light group is used to provide light to the plants.

The benefits of the present invention are: the invention can facilitate users to splice multiple planting water tanks through the flow holes to form a complete indoor planting system indoors, according to the needs of home or indoor layout. Since each planting water tank is provided with communicating holes in each connection direction, which can facilitate the user to flexibly arrange and design the connection of the planting water tank according to the settings of the home or furniture to achieve adaptation. At the same time, each planting water tank is also paired with a corresponding light group. The light group can also be installed above the planting water tank by hanging or fixing according to actual needs, so as to provide photosynthetic lighting for plants. The invention improves the design of the existing indoor hydroponic planting. The planting water tank and the light group adopt a modular design, which is convenient for free collocation and installation according to the needs of the planting space, and is more beautiful and convenient. While cultivating the needs of planting, it also adds more elements of green decoration to the interior.

BRIEF DESCRIPTION OF THE DRAWINGS

In order to more clearly illustrate the specific embodiments of the present invention or the technical solutions in the prior art, the following will briefly introduce the drawings that need to be used in the description of the specific embodiments or the prior art. Throughout the drawings, similar elements or parts are generally identified by similar reference numerals. In the drawings, elements or parts are not drawn in actual scale.

Figure 1:
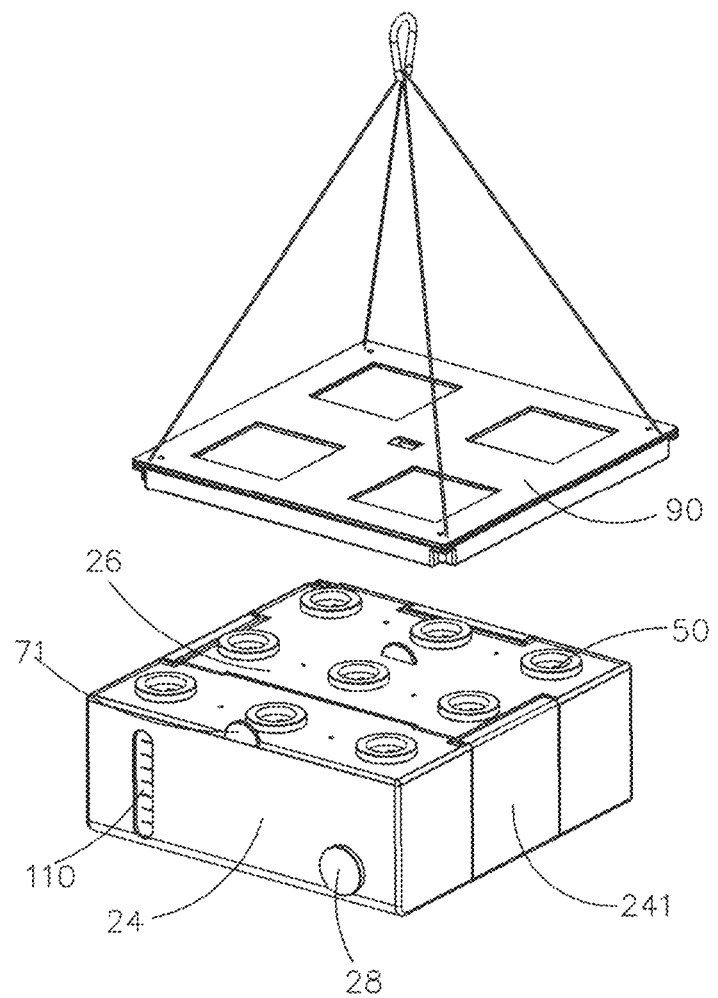
FIG. 1 is a perspective view of a planting machine of one embodiment of the present invention.

The reference signs of the planting machine 1 are as follows:

Conductive component 30; first installation platform 10; first conductive part 31; through hole 11; second conductive part 32; clipping recess 12; controller 40; clipping protrusion 13; planting cup 50; platform body 14; air pump 60; top plate 15; air pump body 61; second installation platform 20; air pump button 62; second clamping part 21; cover plate 70; clamping hole 211; handhold portion 71; third clamping part 22; pillar 80; clamping groove 221; first end 81; fourth clamping part 23; clamping post 811; hook 231; second end 82; light group 90; opening 25; light body 91; movable cover 26; light intensity button 92; bottom case 27; wheel set 100; flow hole 271; liquid level indicator 110; indicate hole 272; charging port 120; water outlet 28; sealing member 130; first direction F1; sealing plug 140; second direction F2; lid 241; connecting pipe 242; fastening groove 243; water supply pipeline 244; return water pipeline 245; water storage device 246; water pump 247; valve 248; spray pipe 249; mounting plate 901; luminous plate 902; hanging hook 903; groove 904; magnet 905; lifting bracket 906.

DESCRIPTION OF THE EMBODIMENTS

In order to facilitate the understanding of the present invention, the present invention will be described in more detail below in conjunction with the accompanying drawings and specific embodiments. It should be noted that when an element is said to be "fixed" to another element, it may be directly on the other element, or there may be one or more intervening elements there between. When an element is referred to as being "connected to" another element, it can be directly connected to the other element or one or more intervening elements may be present therebetween. The terms "vertical", "horizontal", "left", "right" and similar expressions are used in this specification for the purpose of description only.

Unless otherwise defined, all technical and scientific terms used in this specification have the same meaning as commonly understood by one of ordinary skill in the technical field of this application. The terms used in the description of the present application are only for the purpose of describing specific embodiments and are not used to limit the present application. The term "and/or" used in this specification includes any and all combinations of one or more of the associated listed items.

Figure 2:
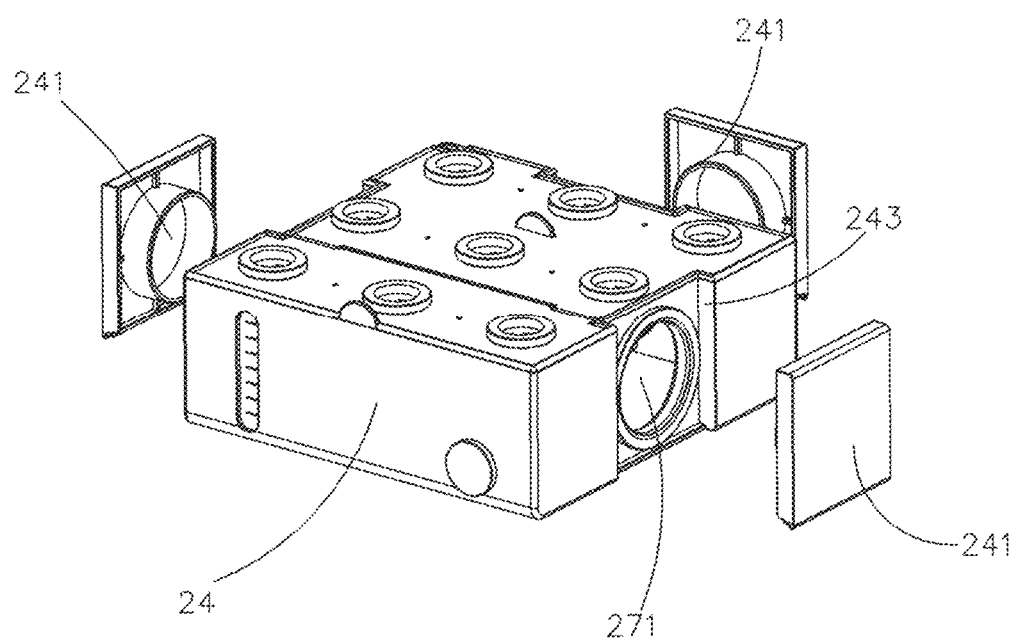
FIG. 2 is an exploded view of the planting water tank of one the embodiment of the present invention.

Referring to FIG. 1, the planting machine, at least includes the planting water tank 24, the light group 90 and the controller. Wherein the planting water tank 24 is used for storing the liquid needed for planting plants, generally the water adds nutrient solution. For the convenience of observing the situation of the planting water tank 24 or removing the sundries in the planting water tank 24, etc., the upper surface of the water tank is open and covered with the movable cover 26. Then the planting cup 50 for placing planting plants is set on the movable cover plate 26, specifically a plurality of through holes are evenly arranged on the cover according to the spacing, and then the planting cup 50 is put into the through hole, The bottom of the planting cup 50 allows the roots of the plants to extend into the liquid in the planting tank 24. The upper edge of the planting cup 50 is inserted into the through hole. The liquid in the planting water tank 24 needs to flow, in order to regularly add the nutrient solution needed for plant growth in the liquid, and also the flow of liquid can take away the harmful ingredient to reduce its exchange with plants, such as hazardous substances and impurities, etc. Therefore, at least one side of the planting water tank 24 provides a flow hole 271, and the flow hole 271 connects to the pump body for keeping the flow of the liquid. In order to facilitate the user to freely expand the planting area by splicing multiple planting water tanks 24 along the horizontal or vertical direction and keeping the liquid flowing and circulating between all the planting water tanks 24, it is necessary to set multiple circulation Hole 271. For some of the flow holes 271 that need not be connected, a cover 241 is provided at the flow hole 271 to close the flow hole 271 and prevent liquid leakage, referring to FIG. 2. In order to seal the flow hole 271 with the cover 241, a fastening groove 243 is set at the flow hole 271 of the planting water tank 24, and the cover 241 is inserted into the fastening groove 243 to close the flow hole 271. In addition, a sealing structure, such as sealing rings, is necessary to prevent liquid from leaking.

As the plants are grown indoors, sunlight cannot reach the plants to complete photosynthesis. So usually, light group 90 should be set up to emit light simulating the sun. the light group 90 can be arranged on the top of planting water tank 24 by suspension or fixing. Of course, it is also necessary to control the light group 90 by the controller according to the lighting time and intensity required for the growth of various plants. The circuit of the light group 90 is connected to the output port of the controller for the light group 90. Certainly, the function of the controller is not simply used to control the illumination of the light group 90, for the flow of the liquid in the planting water tank 24, the controller also connects to the pump body for controlling the flow of liquid etc.

Figure 3:
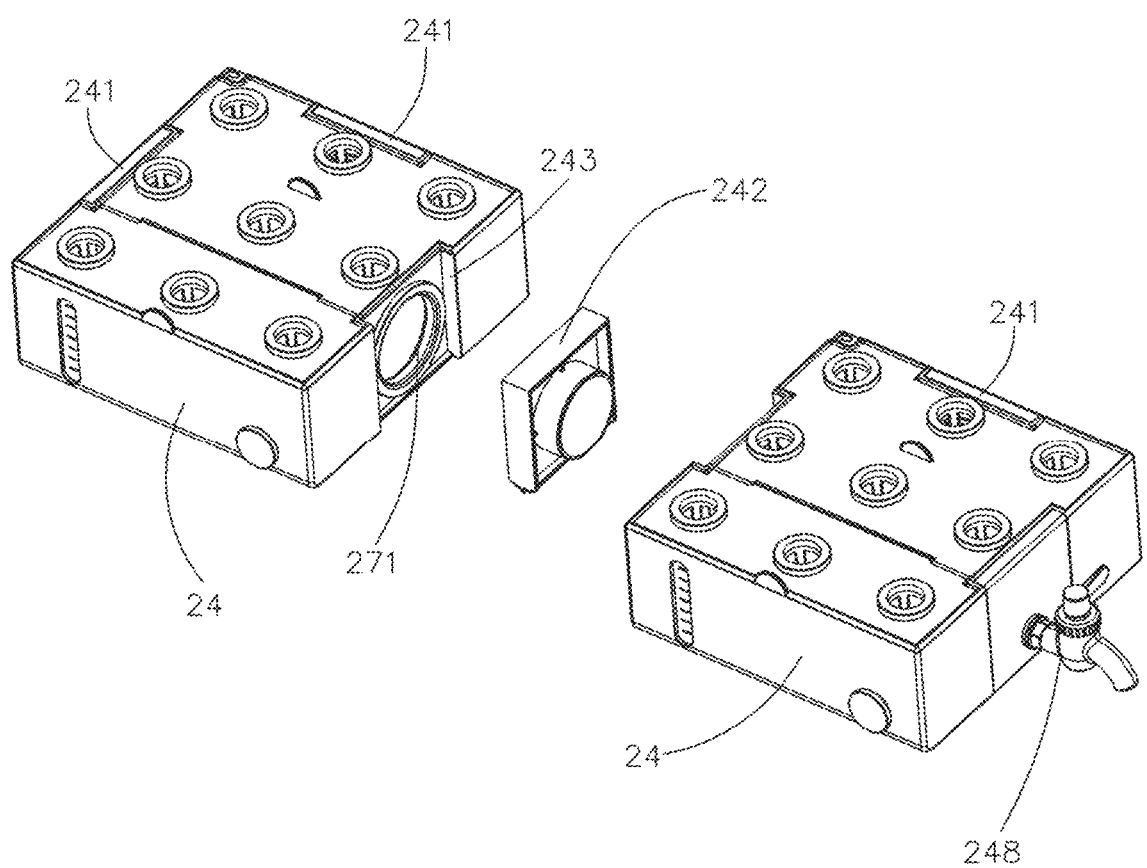
FIG. 3 is the disassembled diagram after a plurality of assembled planting water tanks of the present invention.

Referring to FIG. 3, when a plurality of planting water tanks 24 are spliced together, they need to be connected through the flow holes 271. The lid 241 should be taken off from the flow hole 271, then put the connecting pipe 242 to connect the flow hole 271 of the adjacent planting water tank 24. More specifically, the connecting pipes 242 are respectively inserted into the fastening grooves 243 of the planting water tanks 24, and the connecting pipes 242 are provided with pipe holes for communicating with the adjacent planting water tanks 24. The outer wall of the pipe hole matches the inner wall of the flow hole 271 and they are sealed together. The planting water tanks 24 are generally designed as a cuboid, so they have 4 sides arranged along the horizontal direction, then the planting water tank 24 can be horizontally spliced and expanded along four directions. User only needs to remove the lid 241 at the flow hole 271 of the expanding direction, and connect them through the connecting pipe 242. The operation is very simple, convenient and flexible.

Figure 4:
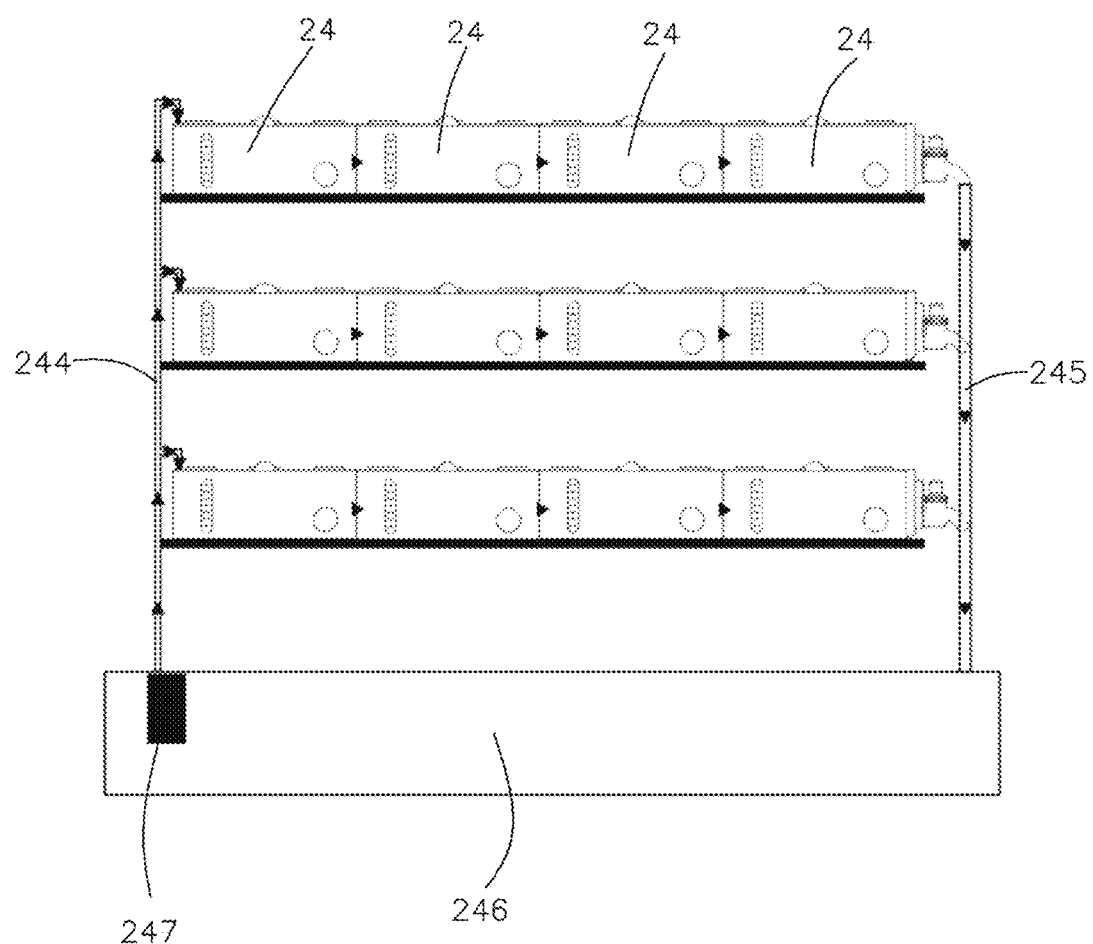
FIG. 4 is a schematic diagram of the planting system of one the embodiment of the present invention.

Referring to FIG. 4, a plurality of planting water tanks 24 are spliced to form a planting group. Because the liquid in the planting water tank 24 of needs to flow to provide sufficient nutrients and take away harmful substances and impurities, a water supply cycle is composed of the water supply pipeline 244 and the return water pipeline 245. Each planting group is connected with the water supply pipeline 244 and the water return pipeline 245 respectively. In addition, a water storage device 246 is also provided, the water supply pipeline 244 connects to it by a water pump 247. And the return water pipeline 245 of the planting group is connected to the water storage device 246 to form a planting system as a whole. The inventor also sets a valve 248 at the flow hole 271 where the return water pipeline 245 connects to the planting water tank 24 in the planting croup. The valve 248 is fixed on the lid 241 and then installed at the flow hole 271 through the fastening groove 243. Opening and closing the valve 248 can control the circulation and the flow rate of the water supply.

For easily observing the water level of the planting water tank 24 in time to prevent from causing dis-immersed the roots of the plants due to the low water level. So, the inventor provides a liquid level indicator 110 on the side of the planting water tank 24 to facilitate observing the liquid level of the planting water tank 24. The liquid level indicator 110 is a light-transmitting window set on the side of the planting water tank 24. The user can directly observe the water level in the planting water tank 24 through the liquid level indicator 110 so that to control the flow rate of the water supply cycle, such as the water pump 247 and the valve 248, to control the water level in the planting water tank 24.

During the planting process, the user needs to regularly check the root growth of the plant to determine the health of the plant. Usually in order to check the situation of the root of the plant, it is necessary to lift the movable cover 26. For the convenience of operation, the movable cover 26 of the present invention is composed of two sets of cover plates connected by hinges, and the cover plates are provided with handhold portions 71. The user can easily lift the cover plate through the handhold portion 71, so that the planting cup 50 can be lifted up and the root condition of the plant can be easily observed by the user. Similarly, the other cover plate can also be operated in the same way.

Figure 5:
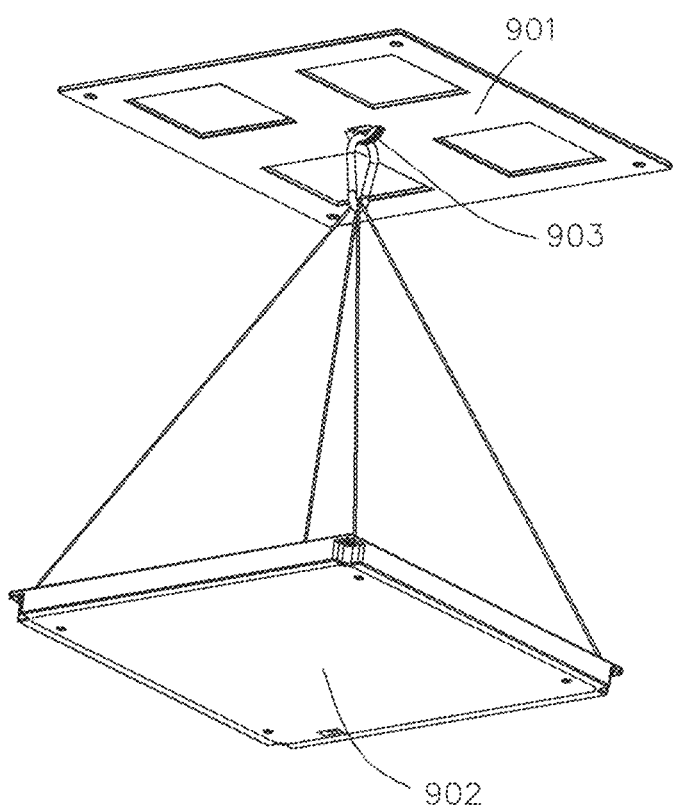
FIG. 5 is an embodiment of one usage of the light group in the invention.
Figure 6:
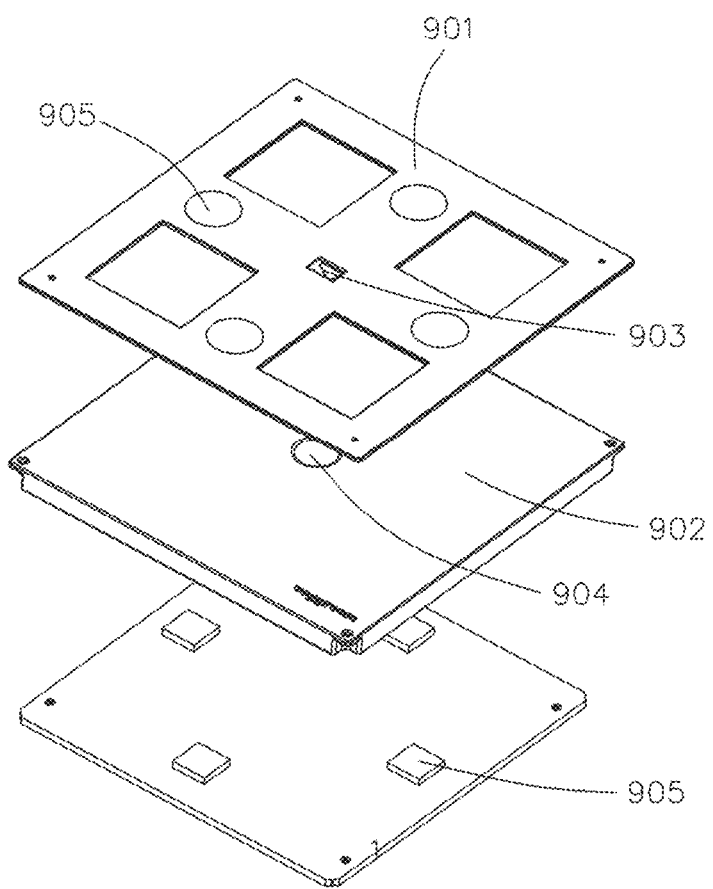
FIG. 6 is an exploded view of the light group in the present invention.
Figure 14:
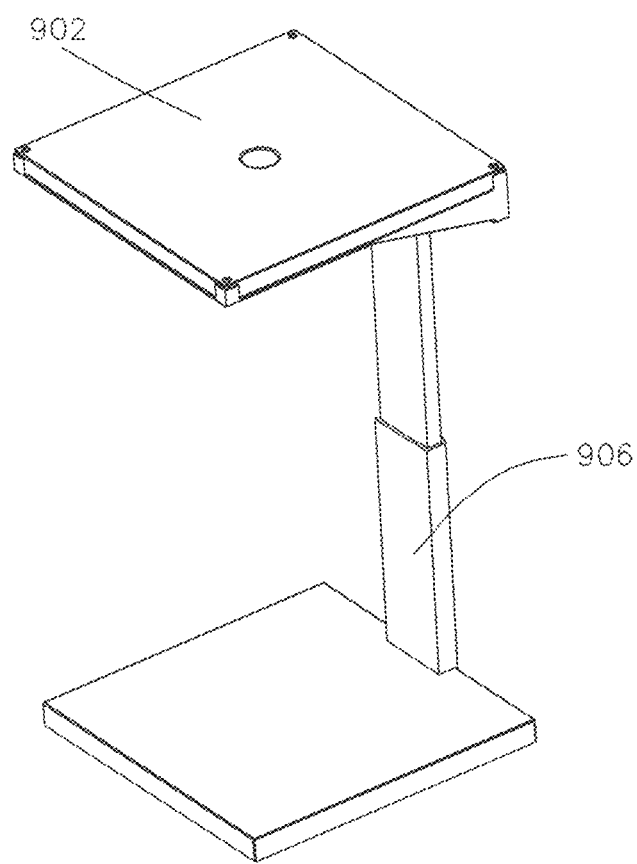
FIG. 14 is an embodiment of one usage of the light group of the present invention.

The light croup 90 can use different structures, such as suspension or fixing, according to different situations. Therefore, the light group 90 is composed of a mounting plate 901 and a luminous plate 902 respectively. Moreover, the mounting plate 901 and the luminous plate 902 are detachable, so that the light group 90 can be installed in a hanging or fixing manner. More specifically, the mounting plate 901 is provided with a hanging hook 903, and the upper surface of the luminous plate 902 matched with the mounting plate 901 is correspondingly provided with a groove 904 for accommodating the hanging hook 903. For the suspension method, the mounting plate 901 can be separated from the luminous plate 902, and the mounting plate 901 fixes to the installation surface first, and then the luminous plate 902 is hoisted on the suspension hook 903 by a suspension wire and hung under the mounting plate 901, referring to FIG. 5. And there are ways to fix the mounting plate 901 to the installation surface, such as screws, glue or magnetic attraction, etc. If adopting the mode of magnetic attraction, at least the mounting plate 901 or the installation surface is iron, and the other one provides a magnet 905 to connect the mounting plate 901 with the installation surface through magnetic attraction. For the fixed installation method, the luminous plate 902 can be directly fixed to the installation surface for installation. it can be screwed, glued or magnetically attracted. If adopting the mode of magnetic attraction, the luminous plate 902 provides a magnet 905 to attract ironic the installation surface. Referring to FIG. 6, this structure is suitable for tight spaces or environments where planting height is limited. In addition, the light group 90 can also be fixed above the planting water tank 24 through a lifting bracket 906, as shown in FIG. 14.

Figure 7:
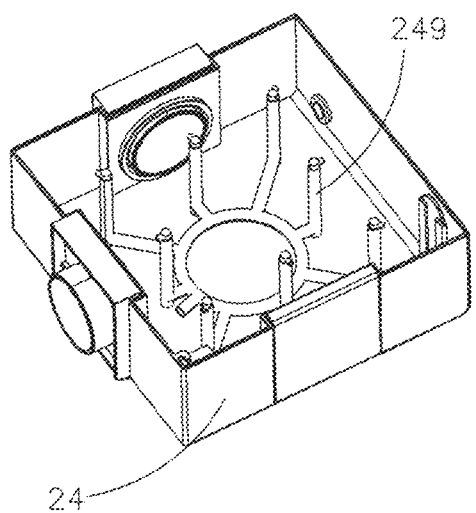
FIG. 7 is the structural representation of spray pipes in the present invention.

Considering if the joint position of the root and the stem is not soaked by water during the planting process, the joint position will produce mildew spots and blackening, which affects the appearance of the plants and the growth of the plant. Because the water level of the planting water tank 24 will range in certain variations, and the position of the plant's root will change during the growth of the plant, it can't guarantee that the water in the planting water tank 24 can submerge the root of every plant. In order to ensure that the roots of all plants in the planting water tank 24 can get enough water to avoid mildew, spray pipes 249 are installed in the planting water tank 24. The spray pipes 249 are connected to the water pump, and the spray port of the spray pipe extends to the roots of the plants to spray water to the root, as shown in FIG. 7. A plurality of spray pipes are arranged in a planting water tank 24, and are evenly distributed, so that the roots of plants planted in various positions can be sprayed.

Figure 8:
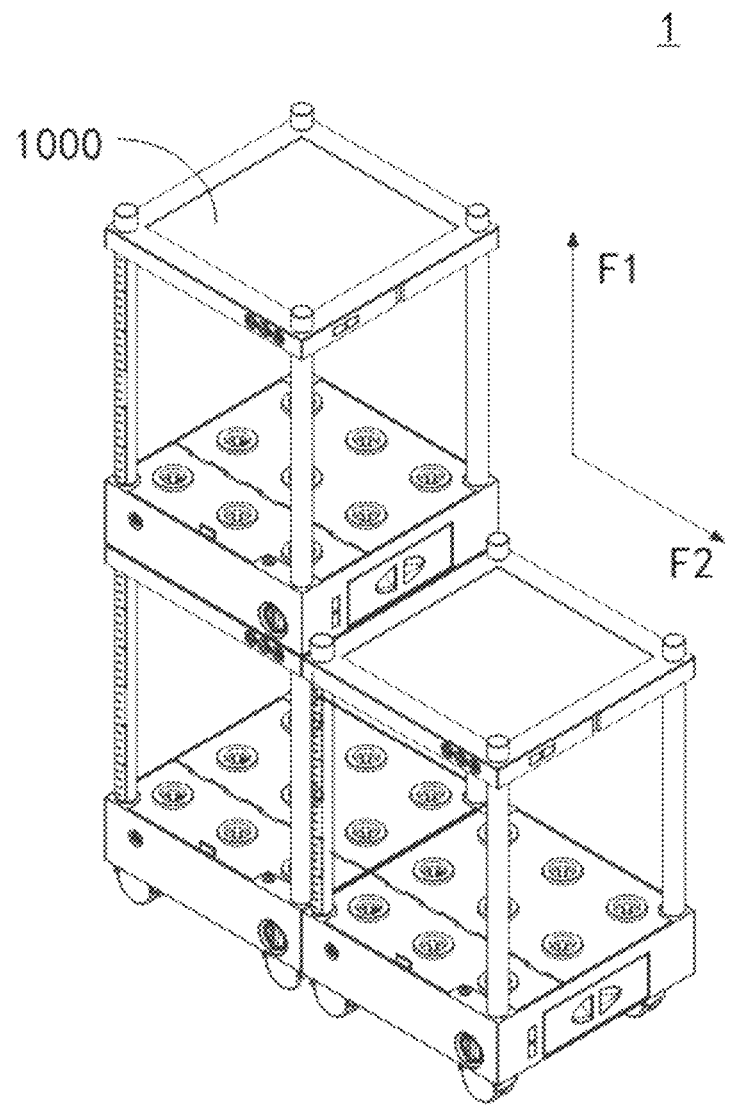
FIG. 8 is a schematic diagram of the planting machine of another embodiment of the present invention.

Referring to FIG. 8 shows a schematic diagram of the planting system 1 of one embodiment in the present application. The planting system 1 includes multiple planting machines, and the multiple planting machines are connected and fixed along a first direction F1, and/or are connected and fixed along a second direction F2. Wherein, the first direction F1 is perpendicular to the second direction F2. Specifically, the first direction F1 is a height direction perpendicular to the ground, and the second direction F2 is a direction on a plane parallel to the ground.

Figure 9:
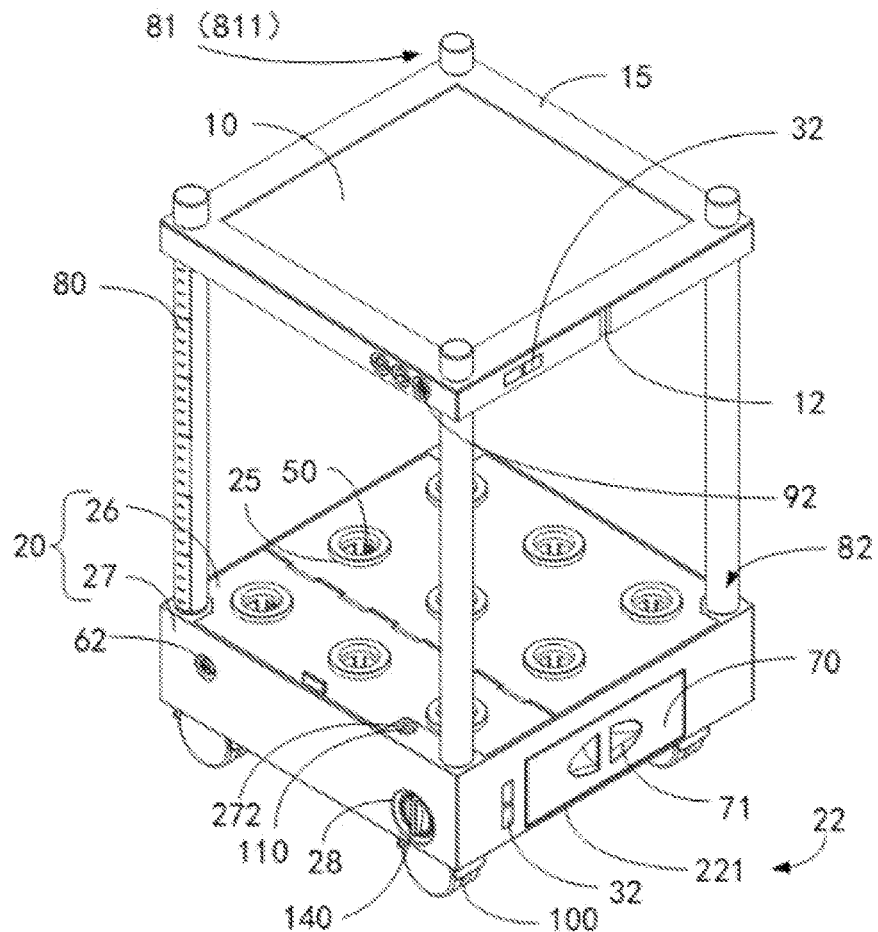
FIG. 9 is a perspective view of the planter of another embodiment of the present invention.
Figure 10:
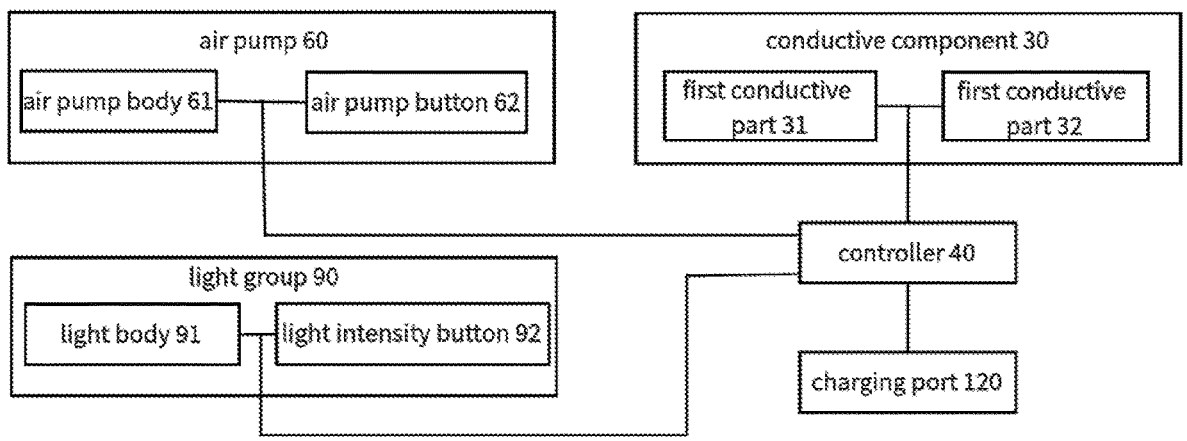
FIG. 10 is a schematic diagram of the electrical connection of the planting machine of one embodiment of the present invention.
Figure 11:
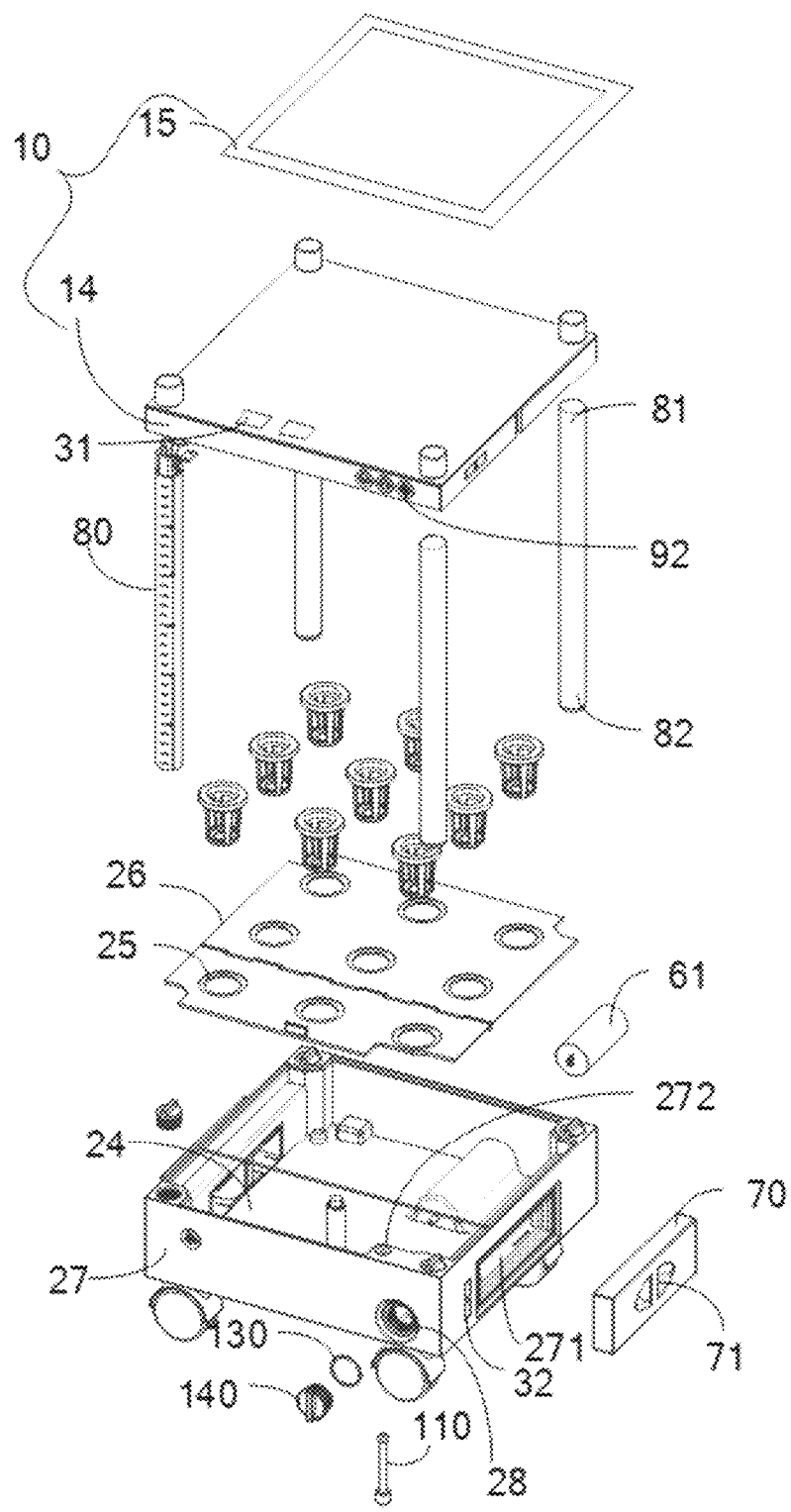
FIG. 11 is an exploded view of the planting machine of one embodiment of the present invention.
Figure 12:
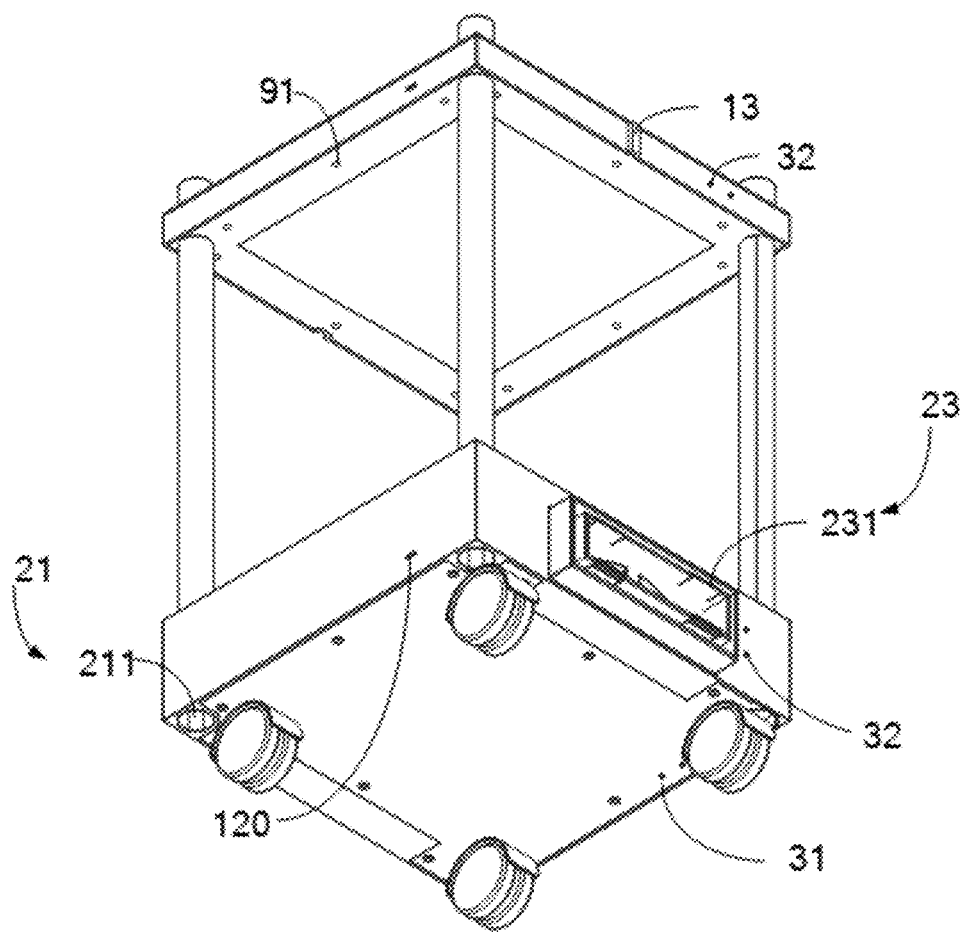
FIG. 12 is a schematic diagram of a planting machine of one embodiment of the present invention.
Figure 13:
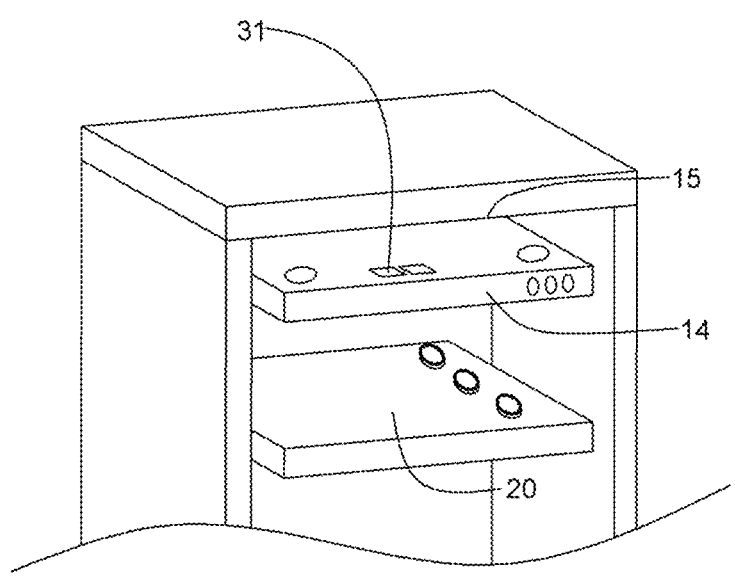
FIG. 13 is a schematic diagram of the installation of the planting machine of one embodiment of the present invention.

For the above-mentioned planter, please refer to FIGS. 9 to 10, which respectively show a perspective view of the planter provided by one embodiment of the present application, a schematic diagram of the electrical connection relationship of the planter provided by one of the embodiments of the present application, and a schematic diagram of the planter provided by one of the embodiments of the present application. An exploded view of a planter provided by an embodiment and a schematic diagram of a planter provided by an embodiment of the present application, combined with other drawings. The planting machine includes a first installation platform 10, a second installation platform 20, a conductive assembly 30, a controller 40 and pillars 80. The first installation platform 10 is provided with a through hole 11. The pillar 80 has a first end 81 and a second end 82 arranged along the first direction F1, and the first end 81 of the pillar 80 is plugged and fixed with the first installation platform 10 at the through hole 11. The second installation platform 20 is provided with a second, a third and a fourth clamping parts 21, 22 and 23. The second clamping part 21 is arranged opposite to the first end 81 along the first direction F1, and the third clamping part 22 is disposed opposite to the fourth clamping part 23 along the second direction F2. The second end 82 is plugged into the second installation platform 20. The conductive assembly 30 includes a plurality of first conductive parts 31 and second conductive parts 32, one of the first conductive parts 31 is installed on the first installation platform 10, and the other first conductive part 31 is installed on the second installation platform 20. One of the second conductive parts 32 is disposed of on the same side as the third clamping part 22, and the other second conducting part 32 is disposed of on the same side as the fourth clamping part 23. The controller 40 is electrically connected to the first conductive parts 31 and the second conductive parts 32, and the first conductive part 31 and/or the second conductive part 32 electrically connects the external power supply to the controller 40. Two planting machines may be connected along a first direction F1 or a second direction F2, the first direction F1 is perpendicular to the second direction F2. It is mentioned that the controller 40 may be partially disposed on the first installation platform 10 and/or on the second installation platform 20. When the two planting machines are connected along the first direction F1, the first end 81 of one planting machine engages with the second clamping part 21 of the other planting machine, and the first conductive parts 31 of the two planting machines are electrically connected. When the two planting machines are connected along the second direction F2, the third clamping part 22 of one planting machine is engaged with the fourth clamping part 23 of the other planting machine, and the second conductive parts 32 of the two planters are electrically connected. It is understood that the first installation platform 10 and the second installation platform 20 in the embodiment of the present invention are both square platforms, and the volume of the first installation platform 10 is slightly smaller than the second installation platform 20 to reduce the pressure of the second installation platform 20. Optionally, the embodiment of the present invention also includes a wheel set 100 detachably installed on the side of the second installation platform 20 and it is close to the ground. The wheel set 100 includes four movable wheels, and the movable wheels can rotate around the first direction F1, or sliding along the second direction F2, and the movable wheel is also equipped with a locking structure that can lock the sliding of the movable wheel so that the planting machine will not slide or move when it is in a fixed position, which is convenient for planting or other operations. When the two planting machine are stacked along the first direction F1, the wheel set 100 can be removed from the second installation platform 20 so as to facilitate the clamping connection between the first end 81 and the second clamping part 21. It is mentioned that the planting machine of the embodiment of the present invention is provided with a charging port 120, the charging port 120 is electrically connected with the controller 40, the charging port 120 provides power supply to the first conductive part 31 and the second conductive part 32, and the controller 40. And electricity can also be transmitted to other planting machines through the first conductive part 31 and the second conductive part 32. The charging port 120 can be but is not limited to USB port, Type-C port, Lighting port, etc. Meanwhile, the invention is also provided with a decorative design for the plug interface making it good looking.

Further, referring to FIG. 9 to FIG. 10, the first end 81 protrudes from the through hole 11 along the first direction F1 to form a clamping column 811. The second clamping part 21 includes a clamping hole 211 recessed relative to the second installation platform 20 along the first direction F1. When the two planting machines are connected along the first direction F1, the clamping column 811 of one planting machine extends into the clamping hole 211 of the other planting machine for clamping fit. More specifically, the clamping column 811 is cylindrical in shape, and the first installation platform 10 includes four clamping columns 811, and each clamping column 811 is arranged at a corner of the installation platform 10. Correspondingly, the first installation platform 10 is provided with four through holes 11, the first conductive part 31 includes a metal conductive sheet, the first conductive part 31 is attached to the outer surface of the first installation platform 10 away from the second installation platform 20, the first conductive part 31 and the controller 40 is electrically connected, and the first conductive part 31 is used to connect the circuit between the two planting machines so that multiple planting machines can just connect an external power supply to one of the planting machines, and then power up all the planting machines. And when the planting machines are stacked along the first direction F1, the first installation platform 10 and the second installation platform 10 are connected by the surface of the first conductive parts 31, so that the planting machines have no exposed lines to have good looking. Optionally, the first conductive part 31 in the embodiment of the present invention is set in the form of a flat copper conductive sheet on the first installation platform 10, and the first conductive part 31 on the second installation platform 20 is set to protrude from the second installation platform 20 when the surfaces of the first installation platform 10 and the second installation platform 20 are attached, the two first conductive part 31 are contacted and electrically connected. The clamping column 811 is provided with a hollow cylindrical cap at the first end 81, and threads are provided inside of the cylindrical cap and outside of the clamping column 811, and the first conductive part 31 is screwed to the clamping column 811. While disassembling the planting machines 100, the four cylindrical caps can be disassembled along the thread direction and then disassembles the first mounting plate 10.

Further, referring to FIG. 9 to FIG. 10, the third clamping part 22 includes a clamping groove 221, and the clamping groove 221 is recessed relative to the second installation platform 20 along the second direction F2. The fourth clamping part 23 includes a hook 231, and the hook 231 protrudes relative to the second installation platform 20 along the second direction F2. When the two planting machines are connected along the second direction F2, the hook 231 of one planting machine extends into the clamping groove 221 of the other planting machine. Specifically, the clamping groove 221 is set as a square frame shape, and there is a gap between the two groove walls for the hook 231 to engage into. The fourth clamping part 23 includes four hooks 231, and the four hooks 231 are disposed opposite to each other, and the protruding part of the hook 231 is elastic, so as to be easily inserted into the clamping groove 221. The second conductive part 32 is arranged in the form of a conductive sheet where the clamping groove 221 is located, and the second conductive part 32 is arranged in the form of a conductive protrusion where the hook 231 is located, that is, the second conductive part 32 is arranged adjacent to the third clamping part 22 and the fourth clamping part 23. And the second conductive part 32 is located on the second installation platform 20, but staggered from the third clamping part 22 and the fourth clamping part 23. Therefore, when two planting machines are connected along the second direction F2, the two second conductive parts 32 have a larger contact area, so that the second conductive parts 32 are electrically connected, and the planting machine will not expose lines to look good.

Further, referring to FIG. 9 to FIG. 10, the first installation platform 10 is also provided with a clipping recess 12 and a clipping protrusion 13. Wherein the clipping recess 12 and the clamping groove 221 are arranged on the same side, and the clipping protrusion 13 and the hook 231 are arranged on the same side. Wherein, the clipping recess 12 and the clipping protrusion 13 are set in the form of a beveled edge emboss and depression to fit each other. The beveled edge is convenient for clamping and inserting. The second conductive part 32 is arranged adjacent to the clipping protrusion 13 and the clipping recess 12. The second conductive part 32 is also located on the first installation platform 10, and is staggered from the clipping recesses 12 and the clipping protrusions 13. The second conductive part 32 is arranged in the form of a conductive sheet where the clamping recess 12 is located, and the second conductive member 32 is provided in the form of a conductive protrusion on the plane where the clamping protrusion 13 is located, so that when the two planting machines are connected along the second direction F2, the two second conductive parts 32 have a larger contact area to facilitate the electrical connection of the second conductive parts 32. And the planting machine will not expose lines to look good.

Referring to FIG. 9 to FIG. 10, the second installation platform 20 is provided with a planting water tank 24, one end of the planting water tank 24 communicates with the external environment through the third clamping part 22, and the other end of the planting water tank 24 communicates with the external environment through the fourth clamping part 23. When the two planting machines are connected along the second direction F2, the planting water tank 24 of one planting machine communicates with the planting water tank 24 of the other planting machine to form a liquid flow channel, and the liquid flow channel is used for liquid circulation. The liquid circulation is used for water supply and nutrient solution. Specifically, the second installation platform 20 includes a movable cover 26 and a bottom case 27 that are partially foldable. The movable cover 26 is covered on the bottom case 27. The movable cover 26 is convenient for opening the cover to add water or check. Moreover, the movable cover plate 26 and the bottom case 27 together form the planting water tank 24, in which the nutrient solution can be stored or circulated, so that the planting machine can perform soilless cultivation. Two flow holes 271 are also arranged on the opposite sides of the bottom case 27 along the second direction F2, and the flow holes 271 communicate with the planting water tank 24, so that the water and nutrient solution of the planting water tank 24 can circulate. It should be mentioned that, the third clamping part 22 and the fourth clamping part 23 are disposed around the flow hole 271. Correspondingly, the planting machine also includes: two cover plates 70, the cover plate 70 is provided with a handhold portion 71, one cover plate 70 is detachably installed on the side of the planting water tank 24 close to the third clamping part 22, and the other cover plate 70 is detachably installed on the side of the planting water tank 24 close to the fourth clamping part 23. The handhold part 71 is used to remove the cover plate 70, that is, the cover plate 70 is set at the flow hole 271 to seal the planting water tank 24. When the cover plate 70 is covered on the flow hole 271, the nutrient solution will not flow out from the flow hole 271 on the side of the cover plate 70. When the two planting machines are connected along the second direction, the cover plate 70 is removed from the flow hole 271, so that to connect the planting water tank 24. It should be mentioned that, in the embodiment of the present invention, the planting machine also includes a liquid level indicator 110, and an indicating hole 272 is set on the side of the bottom case 27. Part of the liquid level indicator 110 is immersed in the planting water tank 24, and the other part is protrude out of the hole 272. The liquid level indicator 110 is set as a physical liquid level indicator, that is, the bottom of the liquid level indicator 110 is floating or partially submerged in the liquid, and the buoyancy provided by the liquid in the planting water tank 24 indicates the liquid level of the current planning water tank. In some other embodiments, it can also be an electronic liquid level indicator, etc. In the embodiment of the present invention, the planting machine includes a seal 130, and the seal 130 is arranged at the connection between the planting water tank 24 and the outer environment, it also include the connection between the planting water tank 24 and the plant root system, so as to provide a sealing effect for the planting water tank 24 to prevent liquid or nutrient solution from leaking out. Wherein the sealing member 130 uses a silicon rubber sealing ring. A water outlet 28 is also provided on the second installation platform 20, the water outlet 28 communicates with the planting water tank 24, and the water outlet 28 is used to discharge the liquid in the planting water tank 24. The water outlet 28 is also covered with a sealing plug 140, and the sealing plug 140 is set as a silicone sealing plug. The sealing member 130 and the sealing plug 140 mentioned in the embodiment of the present invention are used in the connection between the planting water tank 24 and the external environment, but do not include the connection between the planting water tank 24 and the plant root system. Wherein, when the planter is arranged on the external equipment or the storage rack, the pillars 80 will be removed. And at the connection between the pillar 80 and the second installation platform 20, a seal 130 and a sealing plug 140 are also provided, or the sealing plug 140 is directly used to block the planting water tank 24 to prevent liquid from leaking out.

Referring to FIG. 9 to FIG. 10, the planting machine also includes planting cups 50, the second installation platform 20 is provided with a plurality of openings 25 on the side close to the first installation platform 10, and the openings 25 communicate with the planting water tank 24, and the planting cups 25 are detachably installed in the opening 25, the planting cups 50 are used for planting plants. Specifically, the planting cup 50 is funnel-shaped, and a plurality of mesh holes are set on the cup wall of the planting cup 50, so that the cup wall of the planting cup 50 can support plants, and the mesh holes can be used for plant roots protruding, so as to fully contact with the nutrient solution in the planting water tank 24. The opening 25 is disposed on the movable cover 26.

Referring to FIG. 9 to FIG. 10, the planting machine also includes an air pump 60, the air pump 60 is installed in the planting water tank 24, the air pump 60 is electrically connected to the controller 40, and the air pump 60 is used to drive the liquid flow in the planting water tank 24, and/or to fill other gases into the planting water tank 24 for the nutrient solution or other liquid absorbing by plant roots. For example, it can be an oxygen pump, which fills the nutrient solution or water with oxygen for absorption by plant roots. Specifically, the air pump 60 includes an air pump body 61 and an air pump button 62, the air pump body 61 and the air pump button 62 are electrically connected to the controller 40, and the user can directly adjust the flow rate of the air pump body 61 by adjusting the air pump button 62, or by adjusting the air pump button 62. The control controller 40 further adjusts the air pump body 61 according to the gas concentration in the nutrient solution. The air pump body 61 is installed in the planting water tank 24, and the chamber of the second installation platform 20 for accommodating the air pump body 61 is separated from the planting water tank 24. The air pump body 61 partially extends into the planting water tank 24 to fill in gas, reducing the contact of nutrient solution or other liquids with the air pump body 61 to prevent corrosion and oxidation.

Referring to FIG. 9 to FIG. 10, the planting machine also includes pillars 80, one end of the pillar 80 is connected to the first installation platform 10, the other end of the pillar 80 is installed on the second installation platform 20, and it is provided with a length scale. The circuit wires for electrical connection in the planting machine are set inside the pillar 80, so as to facilitate the electrical connection of various electrical components of the planting machine, and the wires are arranged neatly for easy use. When under maintenance, the user can directly open the pillar 80 to facilitate maintenance. Specifically, the planting machine includes four pillars 80, and the four pillars 80 are respectively connected to the four corners of the first installation platform 10, thereby supporting the first installation platform 10 on the second installation platform 20, so as to provide growth space for plants and provide operation space for users. In some other embodiments, only one pillar 80 may be provided, and the pillar 80 is connected to the middle of the first installation platform 10 and the second installation platform 20 so that plants can be arranged around the pillar 80, which is convenient for user operation and looks beautiful. Scales are provided along the pillar 80, so that the user can measure the growth height of plant and the user can record the information of the plant. Or, the scale is convenient for the user to directly know the distance between the first installation platform 10 and the second installation platform 20.

Referring to FIG. 9 to FIG. 10, the planting machine also includes a light group 90, the light group 90 is installed on a side of the first installation platform 10 close to the second installation platform 20, the light group 90 is electrically connected to the controller 40, and the light group 90 is used to provide light to the plants. Specifically, the light group 90 includes several light bodies 91 and light intensity buttons 92. The light bodies 91 and the light intensity button 92 are all electrically connected to the controller 40, so that the user can directly control the light bodies 91 through the light intensity button 92. Or the controller 40 controls the light intensity of the light bodies 91 according to the environmental information. Wherein, the light bodies 91 may be adapt to the light intensity of different plants.

In summary, the controller 40 is electrically connected to other electronic devices such as the first conductive part 31, the second conductive part 32, the air pump body 61, the air pump button 62, the lights bodies 91, and the light intensity button 92. So that it can supply power by the first conductive part 31 and/or the second conductive 32 while the planting machines are connected to each other. In some other embodiments, the controllers 40 of multiple planting machines can perform unified control or separate control. That is, when multiple planters are stacked along the first direction F1, they can be electrically connected through the first conductive part 31, and use the same power supply. When multiple planting machines are connected along the second direction F2, they can be connected through the second conductive part 32. The planting water tank 24 is also connected so that water and nutrient solution can flow between and the user can manage multiple planting machines at the same time.

Referring to FIG. 9 to FIG. 13, in the embodiment provided in this invention, the planting machine 100 also includes a magnetic attractor (not shown in the figure), correspondingly, the first installation platform 10 includes a platform body 14 and a top plate 15. The top plate 15 is detachably installed on the platform body 14 and it is away from the installation platform 20. The material of the top plate 15 is a metal material such as iron. The magnetic attractor is accommodated inside the platform body 14. When the planting machine 100 is accommodated on other external devices or storage racks, the pillars 80 of the planting machine 100 can be removed, and then the first installation platform 10 can be fixed on other external devices or storage racks. Specifically, when other external devices or storage racks are made of metal materials or have magnetism, it is sufficient to directly attach the first installation platform 10 to other external devices or storage racks. When other external devices or storage racks are not magnetic or are not made of metal materials, the top plate 15 paste on other external devices or storage racks, and then attract the platform body 14 with the magnetic parts to the top plate 15. When other external devices or storage racks are not magnetic or are not made of metal materials, the first installation platform 10 can also be locked and attached to other external devices or storage racks by a flexible line through the through hole 11, such as ropes, belts and so on.

The embodiment of the present invention provides a planter, the planting machine includes a first installation platform 10, a second installation platform 20, a conductive assembly 30, a controller 40 and pillars 80. The first installation platform 10 is provided with a through hole 11. The pillar 80 has a first end 81 and a second end 82 arranged along the first direction F1, and the first end 81 of the pillar 80 is plugged and fixed with the first installation platform 20 at the through hole 11. The second installation platform 20 is provided with a second, a third and a fourth clamping part 21, 22 and 23. The second clamping part 21 is arranged opposite to the first end 80 along the first direction F1, and the third clamping part 22 is disposed opposite to the fourth clamping part 23 along the second direction F2. The second end 82 is plugged into the second installation platform 20. The conductive assembly 30 includes a plurality of first conductive parts 31 and second conductive parts 32, one of the first conductive parts 31 is installed on the first installation platform 10, and the other first conductive part 31 is installed on the second installation platform 20. One of the second conductive parts 32 is disposed of on the same side as the third clamping part 22, and the other second conducting part 32 is disposed of on the same side as the fourth clamping part 23. The controller 40 is electrically connected to the first conductive parts 31 and the second conductive parts 32, and the first conductive part 31 and/or the second conductive part 32 electrically connects the external power supply to the controller 40. Two planting machines may be connected along a first direction F1 or a second direction F2, the first direction F1 is perpendicular to the second direction F2. It is mentioned that the controller 40 may be partially disposed of on the first installation platform 10 and/or on the second installation platform 20. When the two planting machines are connected along the first direction F1, the first end 81 of one planting machine engages with the second clamping part 21 of the other planting machine, and the first conductive parts 31 of the two planting machines are electrically connected. When the two planting machines are connected along the second direction F2, the third clamping part 22 of one planting machine is engaged with the fourth clamping part 23 of the other planting machine, and the second conductive parts 32 of the two planters are electrically connected. Through the above structure, when the planting machine is in use, the electrical connection between the first conductive part 31 and another conductive part, and/or, the electrical connection between the second conductive part 32 and another second conductive member 32 is stable, and the layout of wire is simple.

Based on the same inventive concept, the embodiment of the present invention also provides another technical solution, the planting system 1 includes a plurality of planting machines. The planting machines have the same structure as the above-mentioned planting machines. Multiple planting machines can be connected and fixed along the first direction F1 and/or the second direction F2, so as to be convenient for users to use. Therefore, the planting system 1 can also improve the current process of users using planting machine, which often requires multiple planting machines to be used in combination, but the multiple planting machines are only combined in the form of neatly placed or simple connections, and the wiring is complicated, it is not convenient to use.

It should be mentioned that preferred embodiments of the invention are given in the specification and accompanying drawings of the application, but the application can be implemented in many different forms, and are not limited to the embodiments described in the specification. These embodiments are not intended as additional limitations on the content of the present application, and the purpose of providing these embodiments is to make the understanding of the disclosure of the present application more thorough and comprehensive. Moreover, the above-mentioned technical features continue to be combined with each other to form various embodiments not listed above, which are all regarded as the scope of the description of this application; furthermore, for those of ordinary skill in the art, they can be improved or transformed according to the above description, And all these improvements and transformations should belong to the protection scope of the appended claims of this application.

What is claimed is:

1. A planting machine comprising:
    a least one planting water tank which is opened at the upper surface and covered with a movable cover, and planting cups for planting plants are arranged on the movable cover;
    a flow hole which is provided on at least one side of the planting water tank, and a lid which is configured to close the flow hole;
    a light group, which is suspended or fixed above the planting water tank; and a controller with an output port, wherein the light group connects to the output port;

wherein a fastening groove is arranged at the flow hole of the planting water tank, and the cover is inserted into the fastening groove to seal the flow hole.

2. The planting machine of claim 1, wherein a plurality of planting water tanks are spliced with each other and communicated through the flow holes when the flow holes are not closed by corresponding lids; connecting pipe is used to communicate with the two flow holes are respectively inserted in fastening grooves of the planting water tanks, and the connecting pipe is provided with pipe hole for connecting adjacent planting water tanks; the outer wall of the pipe hole matches the inner wall of the flow hole and are sealed together.

3. The planting machine of claim 2, wherein a plurality of planting water tanks are spliced to form a planting group, and each planting group is connected to a water supply pipeline and a return water pipeline;

and comprising a water storage device, which is connected to the water supply pipeline through a water pump, and the return water pipeline of the planting group is connected to the water storage device to form a planting system.

4. The planting machine of claim 3, wherein the planting group and the return water pipeline are connected to the planting water tank through the flow hole, and a valve is arranged on the lid;

the valve is fixed on the lid which is set at the flow hole through the fastening groove.

5. The planting machine of claim 1, wherein a liquid level indicator is set at one side of the planting water tank for observing the liquid level of the water tank; the liquid level indicator is a light-transmitting window set on one side of the planting water tank.

6. The planting machine of claim 1, wherein the light group is composed of a mounting plate and a luminous plate; the mounting plate and the luminous plate are detachable; the mounting plate is provided with a hanging hook, and the luminous plate is hoisted under the mounting plate through the hanging hook.

7. The planting machine of claim 6, wherein comprising spray pipes which are arranged in the planting water tank, and the spray pipes are connected to a water pump, and a nozzle of the spray pipe extends to a root of the plant and sprays water to the root.

8. A planting machine comprising:

a planting water tank which is opened at the upper surface and covered with a movable cover, and planting cups for planting plants are arranged on the movable cover;

a flow hole which is provided on at least one side of the planting water tank, and a lid which is set to close the flow hole;

a light group, which is suspended or fixed above the planting water tank; and a controller with an output port, wherein the light group connects to the output port;

wherein the movable cover plate is composed of two sets of cover plates which are connected by hinges, and the cover plate is provided with a handhold portion.

9. A planting machine comprising:

a planting water tank which is opened at the upper surface and covered with a movable cover, and planting cups for planting plants are arranged on the movable cover;

a flow hole which is provided on at least one side of the planting water tank, and a lid which is set to close the flow hole;

a light group, which is suspended or fixed above the planting water tank; and a controller with an output port, wherein the light group connects to the output port;

wherein the light group is composed of a mounting plate and a luminous plate;

the mounting plate and the luminous plate are detachable; the mounting plate is provided with a hanging hook, and the luminous plate is hoisted under the mounting plate through the hanging hook; and wherein a magnet is embedded in the mounting plate to attract to an installation surface; and another magnet is set in the luminous plate to attract to the mounting plate.

\* \* \* \* \*